US010988236B2

(12) United States Patent
Pul (10) Patent No.: US 10,988,236 B2
(45) Date of Patent: Apr. 27, 2021

(54) PIPE PROPS ROTARY WING

(71) Applicant: George Pul, Las Vegas, NV (US)

(72) Inventor: George Pul, Las Vegas, NV (US)

( * ) Notice: Subject to any disclaimer, the term of this patent is extended or adjusted under 35 U.S.C. 154(b) by 116 days.

(21) Appl. No.: 16/128,537

(22) Filed: Sep. 12, 2018

(65) Prior Publication Data

US 2020/0079496 A1 Mar. 12, 2020

(51) Int. Cl.
*B64C 11/46* (2006.01)
*B64C 27/32* (2006.01)
*B64C 11/30* (2006.01)
*B64C 11/28* (2006.01)

(52) U.S. Cl.
CPC .............. *B64C 11/46* (2013.01); *B64C 11/28* (2013.01); *B64C 11/30* (2013.01); *B64C 27/32* (2013.01)

(58) Field of Classification Search
CPC .......... F03D 3/005; F03D 3/061; F03D 3/065; F03D 3/0067; F03D 3/068; F03D 3/02; F05B 2220/30; F05B 2220/706; F05B 2240/213; F05B 2260/902; B64C 11/46; B64C 11/48; B64C 11/50; B64C 11/28; B64C 11/30; B64C 11/301; B64C 11/303; B64C 11/305; B64C 11/306; B64C 11/308; B64C 11/32; B64C 27/32; B64C 27/46; B64C 27/463; B64C 27/467; B64C 27/473
USPC ............................................. 416/119; 290/44
See application file for complete search history.

(56) References Cited

U.S. PATENT DOCUMENTS

| 4,115,027 | A | * | 9/1978 | Thomas | F03D 3/0409 |
| | | | | | 415/53.1 |
| 5,057,696 | A | * | 10/1991 | Thomas | F03D 7/06 |
| | | | | | 290/44 |
| 6,910,873 | B2 | * | 6/2005 | Kaliski | F03D 3/005 |
| | | | | | 416/119 |
| 8,257,018 | B2 | * | 9/2012 | Coffey | F03D 3/005 |
| | | | | | 415/4.2 |
| 8,772,959 | B2 | * | 7/2014 | Lee | F24F 7/02 |
| | | | | | 290/55 |
| 2009/0095838 | A1 | * | 4/2009 | Gerbino | B64C 27/46 |
| | | | | | 244/39 |
| 2009/0202346 | A1 | * | 8/2009 | Baron | F03D 3/068 |
| | | | | | 416/9 |
| 2010/0202871 | A1 | * | 8/2010 | Bech | F16H 37/041 |
| | | | | | 415/1 |

(Continued)

*Primary Examiner* — William V Gilbert (57) ABSTRACT

Pipe Props Rotary Wing of the present invention is a propeller driven propulsion engine in a pipe profile with props or propellers rotating in part as rotary wings around their shafts; the props and shafts are oriented lengthwise along the pipe; and the props in rotations propel directional air transversely through and across the pipe to generate variable directional thrusts and lifts in directions also transverse to the pipe. Pipe Props Rotary Wing is a variable thrusts and lifts propeller driven propulsion engine to unify all propeller driven propulsion engines for all propeller driven aircrafts, including: propeller aircrafts, rotary wing aircrafts or helicopters, and tilt rotor aircrafts. Pipe Props Rotary Wing in a pipe profile, with props rotating in part as rotary wings, is suitable as fixed wings replacements for propeller aircrafts and tilt rotor aircrafts. Been adapted from Omni M-VAWT or Omni Multi Axes-Vertical Axis Wind Turbine with modifications, Pipe Props rotary Wing as propeller driven propulsion engines are unified also with some vertical axis wind turbines.

1 Claim, 5 Drawing Sheets

(56) References Cited

U.S. PATENT DOCUMENTS

2015/0110598 A1* 4/2015 Lee .................. F03D 3/068
  415/4.2
2016/0376003 A1* 12/2016 Feldman ............ B64D 33/08
  703/2

* cited by examiner

PIPE PROPS ROTARY WING

FIELD

The present invention relates generally to props or propellers driven propulsion engines, and more particularly, the present invention relates to props driven propulsion engines in a pipe profile, with props rotating in part as rotary wings rotating around their shafts, and having both props and shafts oriented lengthwise along the pipe.

BACKGROUND OF THE INVENTION

Propeller driven propulsion engines are currently very different for three major classes of propeller driven aircrafts, and they are: propeller aircrafts, rotary wing aircrafts or helicopters, and tilt rotor aircrafts. Pipe Props Rotary Wing of the present invention is a propeller driven propulsion engine in a pipe profile, with props or propellers rotating and propelling directional air for variable directional thrusts and lifts, and offers a unified propeller driven propulsion engines for all propeller driven aircrafts. Pipe Props Rotary Wing in a pipe profile, with props rotating in part as rotary wings, is suitable also as fixed wings replacements for propeller aircrafts and tilt rotor aircrafts. Been adapted from Omni M-VAWT or Omni Multi Axes-Vertical Axis Wind Turbine with modifications, Pipe Props rotary Wing as propeller driven propulsion engines are also unified some vertical axis wind turbines.

SUMMARY OF THE INVENTION

Pipe Props Rotary Wing is a propeller driven propulsion engine in a pipe profile with props or propellers rotating around their shafts, and the props and shafts are oriented lengthwise along the pipe. The props in rotations propel directional air transversely through and across the pipe to generate variable directional thrusts and lifts in directions also transverse to the pipe. Pipe Props rotary Wing is adapted with modifications from Omni M-VAWT, where: Omni M-VAWT, or Omni Multi Axes-Vertical Axis Wind Turbine, is documented in patent application Ser. No. 16/055,099 filed on Aug. 5, 2018, which is rotated and been powered by wind flowing from anyone directions; and Pipe Props Rotary Wing is powered in reverse rotations to propel directional air for variable directional thrusts and lifts.

Pipe Props Rotary Wing is same as Omni M-VAWT for comprising these same assemblies: a sun rotor assembly, a planet rotor assembly, a carrier plate assembly, and an airfoils assembly. These same assemblies and their features are documented in Omni M-VAWT patent application, and are applicable to Pipe Props Rotary Wing; with minor exception, they are not repeated here for Pipe Props Rotary Wing; but they are fully described for the preferred embodiment, which is a simplified Pipe Props Rotary Wing.

Pipe Props Rotary Wing, modified from Omni M-VAWT, is further comprised of a modified rotation and alignment assembly consisted of a controlled rotation and alignment mechanism without rotation limit stops; but for Omni M-VAWT, it is either passively or actively controlled with rotation limit stops and an optional rotation and alignment mechanism. Angle of Rotations, counter clockwise and clockwise, for a planet airfoil is measured by a measurement radial line R centered on the sun stationary shaft and radiate through the planet airfoil chord midpoint; and the Angle of Rotations is measured from the measurement radial line R to the rotated planet airfoil chord. A planet airfoil is fully extended or fully folded at 0.0 and 90 degrees Angle of Rotations, respectively.

Pipe Props Rotary Wing has means to be powered to propel air through provisions such as power motors and engines, and control systems. It also has a rotation and alignment assembly with mechanisms as means to actively control Angle of Rotations of a planet airfoil rotating around its planet rotating shaft. These and other required means and provisions are neither novel nor unique to the present invention, and are not further described.

In operations, Pipe Props Rotary Wing is a propeller driven propulsion engine; been powered, it sets in motions paired planet and sun airfoils in clockwise rotations around sun stationary shaft propelling directional air for variable directional thrusts and lifts. Pipe Props Rotary Wing promotes engine performances through interacting paired planet and sun airfoils, where a planet airfoil, been extendable and foldable, is fully extended or folded as appropriate in front or behind its paired sun airfoil to maximize and minimize propelled directional air for optimum variable directional thrusts and lifts. The engine propulsion performances is overwhelmingly dominated by the performances of high lift and drag hybrid planet airfoils, rotating in part as rotary wings. A planet airfoil is substantially larger and rotating at much greater radial distance than its paired sun airfoil; and a planet airfoil, been actively controlled and aligned, has appropriate Angle of Rotations and airflow angles of attack to propel directional air for optimum variable directional lifts and thrusts. For maximum forward thrusts with forward thrusts speed lower than planet airfoil rotational speed, a planet airfoil concave surface is rotated facing generally aftward as it is rotated clockwise around its sun stationary shaft to forward and aft horizontal rotation points, and to upper vertical rotation point; and its concave surface is rotated facing generally downward as it is rotated clockwise to lower vertical rotation point. For maximum upward lifts, a planet airfoil has its concave surface rotated generally facing downward as it is rotated clockwise to forward and aft horizontal rotation points, and to upper and lower vertical rotation points. A planet airfoil, when fully extended and propelling air in rotations around sun stationary shaft, keeps a constant rotational orientation on either sides of a fully extended planet airfoil as it rotates in between a partially folded and fully extended planet airfoil; as a result, a planet airfoil has a constant lower rotational speed close to half of a linearly changing maximum airfoil tip speed, but has same propulsion performances in propelling same volumes of air. A sun airfoil by itself rotates as an air mixer in rotating air in circles around the sun stationary shaft, producing neither lifts nor thrusts; but in interactions with its paired planet airfoil, a sun airfoil produces secondary lifts and thrusts by been at times acting as flaperons and at times as airflow shield and diverters to its paired planet airfoil.

Pipe Props Rotary Wing of the present invention is a propeller driven propulsion engine in propelling directional air for variable directional thrusts and lifts; and it unifies all propeller driven propulsion engines for all propeller driven aircrafts, including: the propeller aircrafts, the rotary wing aircrafts or helicopters, and the tilt rotor aircrafts. Pipe Props Rotary Wing in a pipe profile with props rotating in part as rotary wings is suitable also as fixed wings replacements for propeller aircrafts and tilt rotor aircrafts. Been adapted from Omni M-VAWT with modifications, Pipe Props rotary Wing as a propeller driven propulsion engines are also unified with some vertical axis wind turbines.

DESCRIPTION OF THE PREFERRED EMBODIMENT

Pipe Props Rotary Wing of the present invention, a propeller driven propulsion engine, is disclosed by a preferred embodiment, which is a simplified Pipe Props Rotary Wing to show with clarity its features and advantages for been powered to propel air for thrusts and lifts. These and other features and advantages of the present invention will become more apparent to one skilled in the art from the following description and claims when read in light of the accompanying drawings for the preferred embodiment of a simplified present invention.

Unless otherwise apparent, or stated, directional references, such as "inner," "inward," "outer," "outward," "downward," "upper", "lower" etc., are for non-limiting descriptive purposes and intended to be relative to the orientation of a particular Pipe Props Rotary Wing of the present invention as shown in the view of that apparatus. Parts shown in a given FIGURE are generally proportional in their dimensions.

Referring to FIGS. 1 thru 4, preferred embodiment 1 of Pipe Props Rotary Wing of the present invention is a propeller driven propulsion engine, and comprises: sun rotor assembly 2, planet rotor assembly 3, carrier plate assembly 4, rotation and alignment assembly 5, and airfoils assembly 6. Preferred embodiment 1 has an X-Y-Z coordinate system centered at sun rotor base support 22, +/− X axis are aft and forward directions in thrusts motions, +/− Z axis are vertical up and down directions in lifts motions. Preferred embodiment 1 is forward facing toward −X and rotates clockwise to propel directional air for variable directional thrusts and lifts, and planet rotors 31 and 32 are shown rotated up to (+) Z axis and down to (−) Z axis, respectively.

Sun rotor assembly 2 is stationary, and is consisted of sun stationary shaft 21 and its base support 22. Planet rotor assembly 3, rotating around sun rotor assembly 2, is consisted of planet rotors 31 and 32, each of which has planet rotating shaft 33 supported at two ends by cap and base plate 34 and 35 through planet bearings 36; and planet rotors 31 and 32 are spaced equally at 180 degrees apart. Shown in particular in FIG. 4, planet rotor 31, rotated up to +Z axis, has its planet rotating shaft 33 centered at X=0.5R and Z=2.0R. Planet rotor 32, rotated down to −Z axis, has its planet rotating shaft 33 centered at X=−0.5R and Z=−2.0R. Dimensions are in reference to 1.0R as the radius for a sun airfoil. Carrier plate assembly 4 is consisted of top and bottom carrier plates 41 and 42, and each of which has center mounted bearing 43. Carrier plate assembly 4, with mounted planet rotor assembly 3 through bearing 36, rotates around and is supported by sun stationary shaft 21 through bearings 43.

Figure 1:
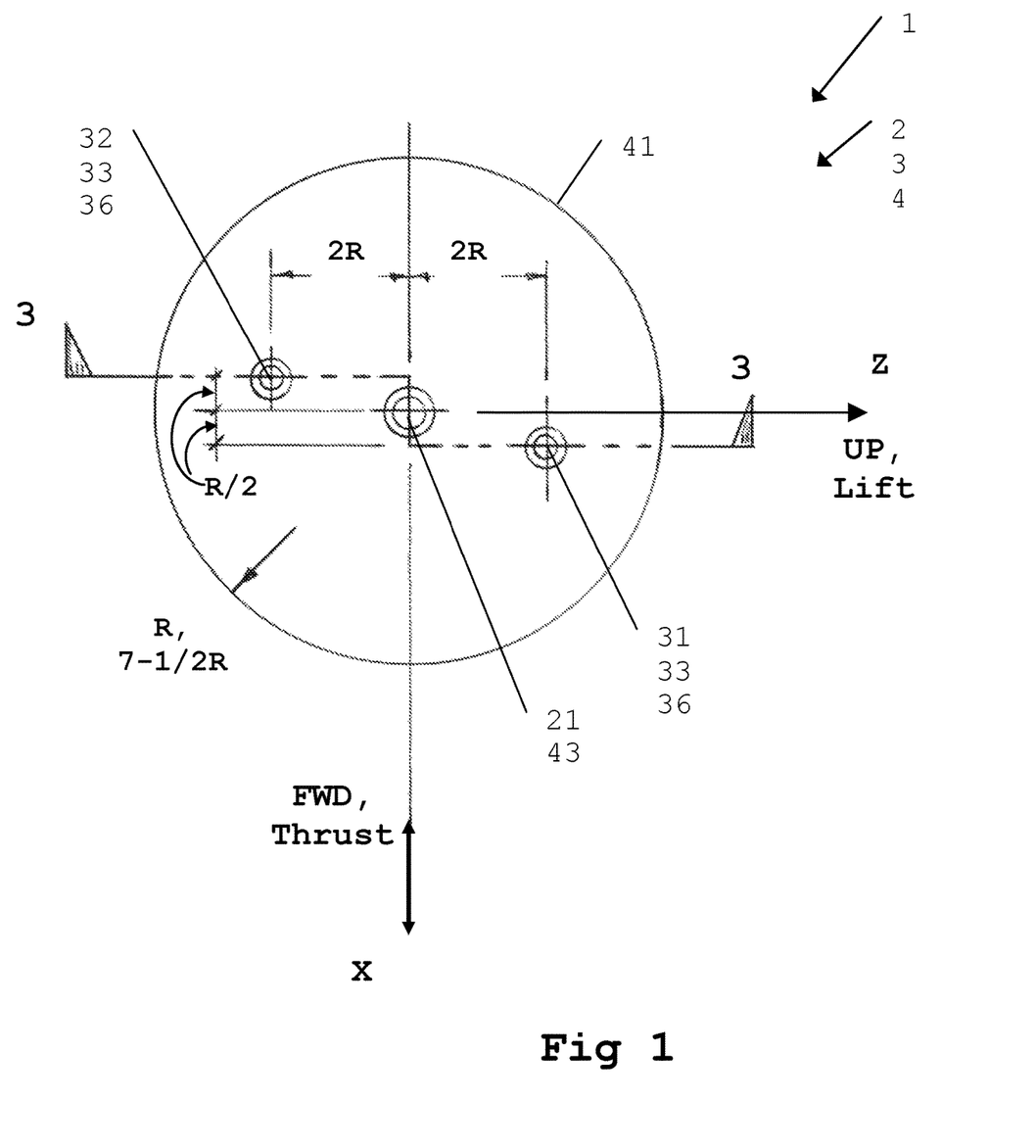
FIG. 1 is an end view of the preferred embodiment of the present invention.
Figure 2:
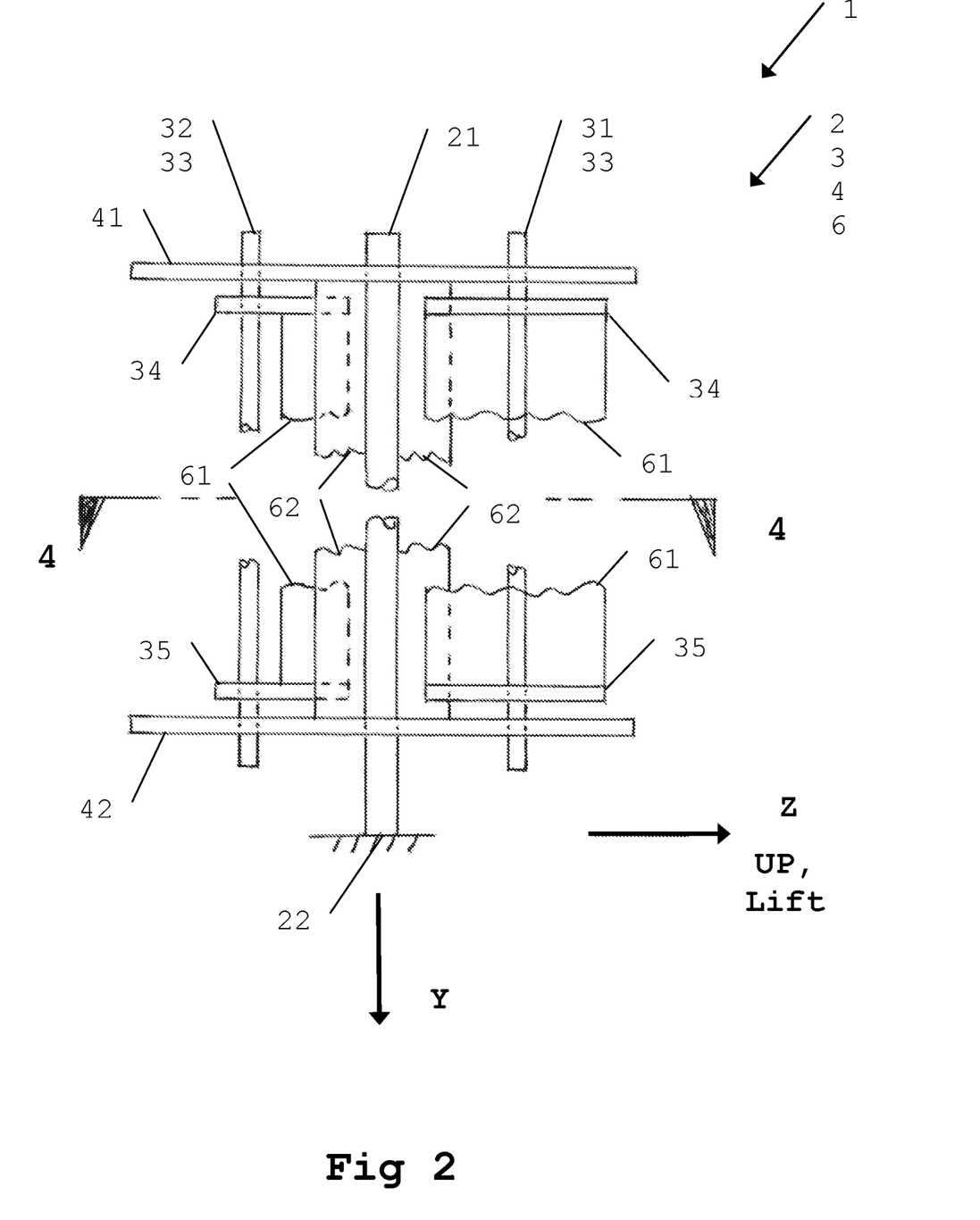
FIG. 2 is an elevation view of the preferred embodiment of the present invention.
Figure 3:
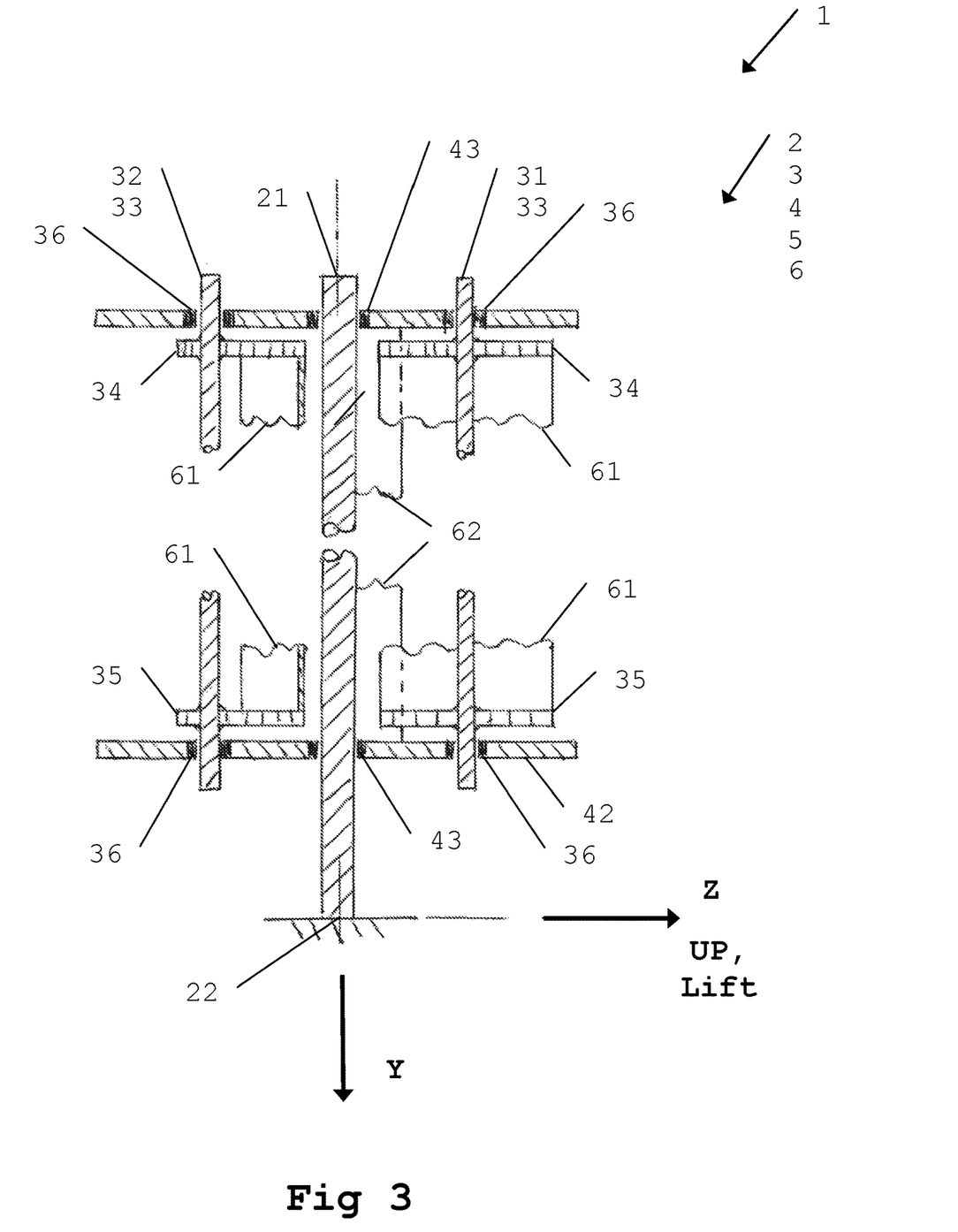
FIG. 3 is a cross section view of the preferred embodiment of the present invention taken along line 3-3 shown in FIG. 1.
Figure 4:
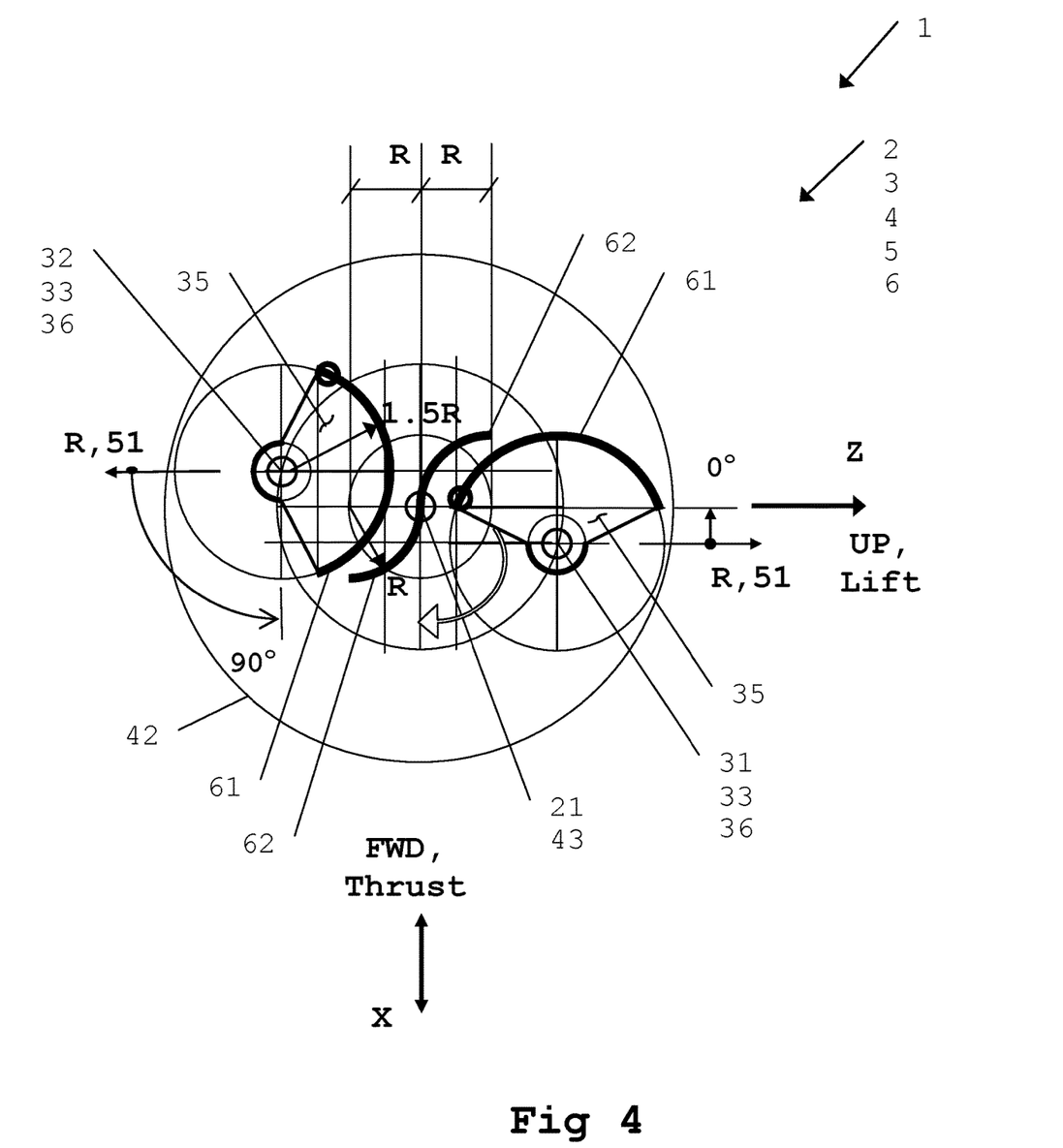
FIG. 4 is a cross section view of the preferred embodiment of the present invention taken along line 4-4 shown in FIG. 2.

Continue referring to FIG. 4, rotation and alignment assembly 5 is consisted of measurement radial line R or 51 or R,51 and rotation and alignment mechanism 52. Angle of Rotations, counter clockwise and clockwise, for planet airfoil 61 is measured by a measurement radial line R,51, a radial line from sun stationary shaft 21 to planet airfoil 61 chord midpoint; and Angle of Rotations is the angle from the measurement radial line R,51 to rotated planet airfoil 61 chord. Rotation and alignment mechanism 52 actively rotates and controls planet airfoil 61 Angle of Rotations and airflows angle of attacks. Airfoils assembly 6 is consisted of paired planet airfoils 61 and sun airfoils 62 in rotations around sun stationary shaft 21. Planet airfoil 61 is fixed mounted at top and bottom to cap and base plates 34 and 35, and it rotates around planet rotating shaft 33 of planet rotors 31 and 32, which are rotated by top and bottom carrier plates 41 and 42 around sun stationary shaft 21. Sun airfoil 62 is fix mounted at top and bottom to top and bottom carrier plates 41 and 42, respectively. Paired planet airfoil 61 and sun airfoil 62, mounted indirectly or directly to top and bottom carrier plates 41 and 42, rotates at the same rate around sun stationary shaft 21.

Paired planet and sun airfoils 61 and 62 are curved segments of circles. Planet airfoil 61 is a curved segment of a circle 1.5R in radius centered at its planet rotating shaft 33. It is shaped for a high lift and drag hybrid airfoil, having a rounded leading edge and tapered trailing edge. Planet airfoil 61 of planet rotor 31 rotated up to +Z axis is orientated as follows: its circular curved segment chord is inline on +Z axis; its rounded leading edge is closest radially from sun stationary shaft 21; its concave surface faces aftward; and it is fully extended with 0.0 degrees Angle of Rotations. Planet airfoil 61 of planet rotor 32 rotated down to −Z axis is oriented as follows: its concave surface faces downward; and it is fully folded with 90 degrees counter clockwise Angle of Rotations. Sun airfoil 62 is quarter of a circle or half of a semicircle with radius 1.0R, and nested within it is its paired planet airfoil 61. Sun airfoil 62, paired to planet airfoil 61 of planet rotor 31, is oriented, where: its semicircle chord is on +Z axis centered at X=0.R and Z=+1.0R; its semicircle concave surface faces aftward; and it is the lower half of the semi circle. Sun airfoil 62, paired to planet airfoils 61 of planet rotor 32, is a rotational image of sun airfoil 62 paired to planet airfoil 61 of planet rotor 31, rotated 180 degrees around sun stationary shaft 21. Sun airfoil 62 is a circular curved segment in the shape of a high drag airfoil, and it rotates in accordance to rotations of its semicircle segment and chord around sun stationary shaft 21. Sun airfoil 62 in rotations is very much like a traditional Savonius VAWT.

Preferred embodiment 1 has means to be powered through provisions such as power motors and engines and control systems. It also has rotation and alignment assembly 5 as means to actively control planet airfoil 61 Angle of Rotations and airflow angles of attacks. These and other means and provisions required for preferred embodiment 1 are neither novel nor unique, and are not further described.

Figure 5A:
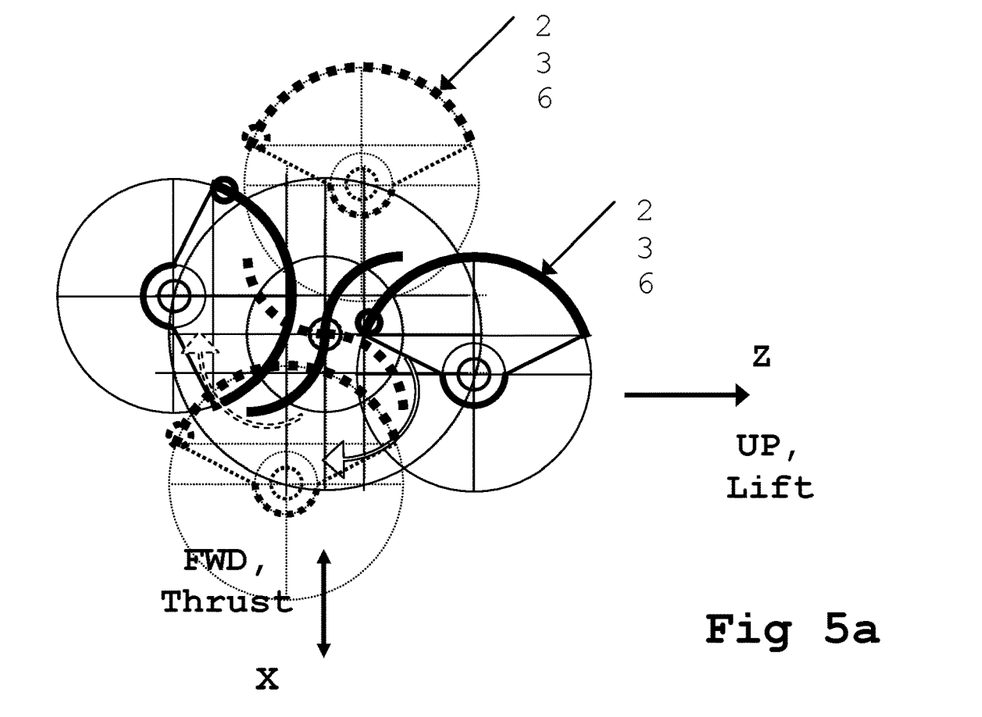
FIG. 5a, b are schematic cross section view of preferred embodiment shown in FIG. 4, rotated by 0 degree shown in solid lines and 90 degrees shown in dashed lines for maximum thrusts and lifts, respectively.

In operations, and referring in particular to FIGS. 5a and b, preferred embodiment 1 of Pipe Props Rotary Wing of the present invention is a propeller driven propulsion engine; and been powered, it sets in motions its paired planet airfoils 61 and sun airfoils 62 in clockwise rotations around sun stationary shaft 21 propelling directional air for variable directional thrusts and lifts. Its paired planet airfoils 61 and sun airfoils 62 are shown rotated by 0 degree in solid lines and 90 degrees in dashed lines for maximum thrusts and lifts in FIG. 5*a* and FIG. 5*b*, respectively. Preferred embodiment 1 propulsion engine performances is promoted through paired planet airfoil 61 and sun airfoils 62 rotating and interacting as props, where planet airfoil 61, been extendable and foldable, is fully extended or folded as appropriate in front or behind its paired sun airfoil 62 to maximize and minimize propelled directional air for optimum variable directional thrusts and lifts. Its propulsion engine performances is overwhelmingly dominated by the performances of high lift and drag hybrid planet airfoils 61 rotating in part as rotary wings; planet airfoil 61 is substantially larger and rotating at much greater radial distance than its paired sun airfoil 62; and a planet airfoil 61, been actively controlled and aligned by rotation and alignment mechanism 52, has appropriate Angle of Rotations and airflow angles of attack to propel directional air for optimum variable directional lifts and thrusts. Planet airfoil 61, when fully extended and propelling air in rotations around sun stationary shaft 21, keeps a constant rotational orientation on either sides of a fully extended planet airfoil 61 as it rotates in between a partially folded and fully extended planet airfoil 61; as a result, planet airfoil 61 has a constant lower rotational speed close to half of a linearly changing maximum airfoil tip speed, but keeps propulsion performances the same in propelling same volumes of air. A sun airfoil 62 in rotations by itself is a mixer in rotating air around sun stationary shaft 21, producing neither thrusts nor lifts; but in interactions with its paired planet airfoil 61, sun airfoil 62 does produce secondary thrusts and lifts by been at times acting as flaperons and at times as airflow shield and diverters to its paired planet airfoil 61.

Maximum forward thrusts shown in FIG. 5*a* for Preferred embodiment 1 of Pipe Props Rotary Wing, a propeller driven propulsion engine, has high lift and drag hybrid planet airfoils 61 rotated and oriented as shown, and their forward thrusts speed are lower than their rotational speed. Planet airfoil 61 concave surface is rotated around its planet rotating shaft 33 to face generally aftward toward +X axis as it is rotated clockwise around sun stationary shaft 21 inline to + and −X axis and inline to +Z axis; and its concave surface is rotated facing generally downward toward −Z axis as it is rotated clockwise inline to −Z axis. A planet airfoil 61 is rotated inline to +Z axis and fully extended at 0 degrees clockwise Angle of Rotations, and it generates most forward thrust and forward thrust induced lifts. It is rotated in line to −Z axis and close to fully folded at 90 degrees counter clockwise Angle of Rotations, and it generates no forward thrust but maximum induced upward lifts from forward thrusts and its own rotation induced airflows at a given optimum angle of attack. It is rotated inline to +X axis and close to fully extended at 90 degrees counter clockwise Angle of Rotations, and it generates large forward thrusts due to its rotation induced airflows at a given optimum angle of attack. It is rotated inline to −X axis and close to fully folded at 90 degrees clockwise Angle of Rotations, and it generates large forward thrusts due to its rotation induced airflows at a given optimum angle of attack. The maximum forward motion thrusts are reduced somewhat by forward motion induced drag forces, and the total lifts are balanced by weights, such as the weight of preferred embodiment 1 of Pipe Props Rotary Wing.

Figure 5B:
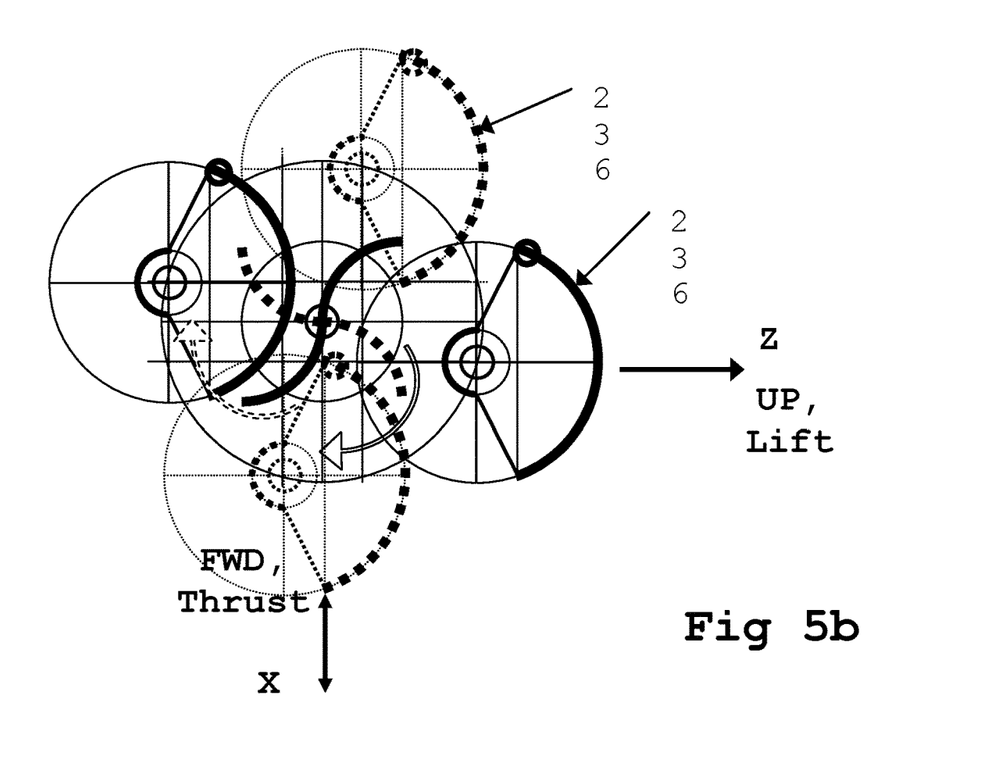

Maximum upward lifts shown in FIG. 5*b* for Preferred embodiment 1 of Pipe Props Rotary Wing, a propeller driven propulsion engine, has high lift and drag hybrid planet airfoils 61 rotated and oriented as shown, where planet airfoil 61 has its concave surface generally rotated around its planet rotating shaft 33 to face downward toward −Z axis as it is rotated clockwise around its sun stationary shaft 21 inline to +/−X and +/−Z axes. Planet airfoil 61 is rotated inline to +Z axis and close to fully folded at 90 degrees clockwise Angle of Rotations, and it generates no forward thrust but some induced lifts from forward thrust in opposition to its own rotation induced airflows at a given optimum angle of attack. It is rotated in line to −Z axis and close to fully folded at 90 degrees counter clockwise Angle of Rotations, and it generates no forward thrust but maximum induced lifts from forward thrust in addition to its own rotation induced airflows at a given optimum angle of attack. It is rotated inline to +X axis and fully extended at 0 degrees clockwise Angle of Rotations, and it generates no forward thrusts but maximum upward lifts from drag forces due to its downward rotations. It is rotated inline to −X axis and fully extended at 180 degrees clockwise Angle of Rotations, and it generates no forward thrusts, but some downward lifts from drag forces due to its upward rotations. The maximum upward lifts are reduced somewhat by weights, such as the weight of preferred embodiment 1 of Pipe Props Rotary Wing.

Preferred embodiment 1 of Pipe Props Rotary Wing of the present invention, in propelling directional air for variable directional thrusts and lifts, is a variable thrusts and lifts propeller driven propulsion engine that unifies all propeller driven propulsion engines for all propeller driven aircrafts, including: the propeller aircrafts, the rotary wing aircrafts or helicopters, and the tilt rotor aircrafts. Preferred embodiment 1 of Pipe Props Rotary Wing in a pipe profile with props rotating in part as rotary wings is suitable also as fixed wings replacements for propeller aircraft and tilt rotor aircrafts. Been adapted from Omni M-VAWT with modifications, preferred embodiment 1 of Pipe Props rotary Wing as propeller driven propulsion engines are unified also with some vertical axis wind turbines.

The preferred embodiment described above is for the purpose of describing features and technical conceptions of a simplified Pipe Props Rotary Wing of the present invention, a propeller driven propulsion engine. But it should be readily apparent that the invention is not limited to the described preferred embodiment alone, and a person skilled in the art may come up with various changes and modifications consistent to the technical concept disclosed herein and within the spirit and scope of the invention. Prime examples of changes and modifications to the described preferred embodiment include: the number of planet rotors; the shapes, sizes, center points, numbers, and types (lift, drag, or hybrid) of planet and sun airfoils; planet high lift and drag hybrid airfoils assembled from segmented main body, leading edge slats, and trailing edge flaperons; and a multiple Pipe Props Rotary Wings assembly, such as an assembly of two counter rotating Pipe Props Rotary Wing. These and other changes are potential optimization variables for Pipe Prop Rotary Wing, a propeller driven propulsion engine. Where stated, "air" and "wind" is broadly meant to be any fluid medium, including water. Required systems such as power motors and engines and mechanisms and controls are neither novel nor unique systems, and are not described in detail for the preferred embodiment of the present invention. Therefore, it is to be understood that modifications and variations may be utilized without departure from the spirit and scope of the invention disclosed herein, as those skilled in the art will readily understand.

Such modifications and variations are considered to be within the purview and scope of the claimed invention and their equivalents.

I claim:

1. A propeller driven propulsion engine driven by at least a first Omni Multi Axes-Vertical Axis Wind Turbine (M-VAWT), comprising:
   a plurality of airfoil assemblies, each said airfoil assembly comprising a carrier plate assembly, a sun rotor assembly, a planet rotor assembly, and a rotation and alignment assembly, wherein:
   a. said carrier plate assembly comprises a top carrier plate and a bottom carrier plate;
   b. said sun rotor assembly comprises a vertically oriented sun stationary shaft having a plurality of sun airfoils of circular curved segments equally spaced around and fixed to said sun Stationary shaft, said circular curved segments extending between said top carrier plate and said bottom carrier plate, said circular curved segments each having a radius defined as 1.0*R, said sun stationary shaft extending through said top carrier plate and said bottom carrier plate, and a first bearing between said sun stationary shaft and said top carrier plate and a second bearing between said sun stationary shaft and said bottom carrier plate;
   c. said planet rotor assembly comprises a plurality of planet rotor shafts equally spaced circumferentially around said sun stationary shaft from a distance of 2.0*R, said planet rotor assembly further comprising for each said planet rotor shaft a cap and a base plate and a planet airfoil extending between said cap and said base plate and affixed thereto; each said planet airfoil rotating relative to said planet rotor shaft, each said planet airfoil having a shape of a circular curved segment having a radius of 1.5*R; and each said cap plate, each said base plate and each said planet airfoil extending between said top carrier plate and said bottom carrier plate, each said planet rotor shaft extending through said top carrier plate and said bottom carrier plate, and a first bearing between each said planet rotor shaft and said top carrier plate and a second bearing between each said planet rotor shaft and said bottom carrier plate; and
   wherein, said at least a first Omni Multi Axis-Vertical Axis Wind Turbine is attached to said propeller driven propulsion engine.

* * * * *